Nov. 17, 1931.                R. SCHWAAR                1,831,973
   METHOD AND DEVICE FOR FINISHING THE INNER EDGES OF THE
           NOTCHES OF PALLETS OF WATCH MOVEMENTS
                    Filed April 28, 1930
*Fig.1.*
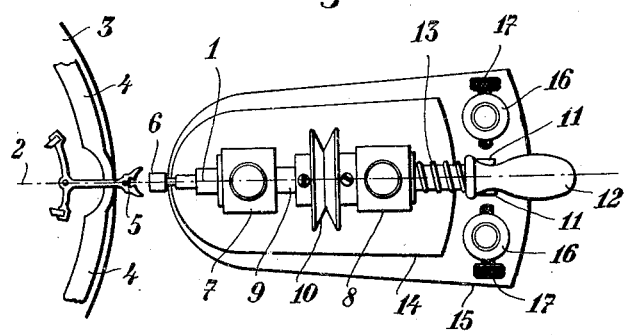
*Fig.2.*
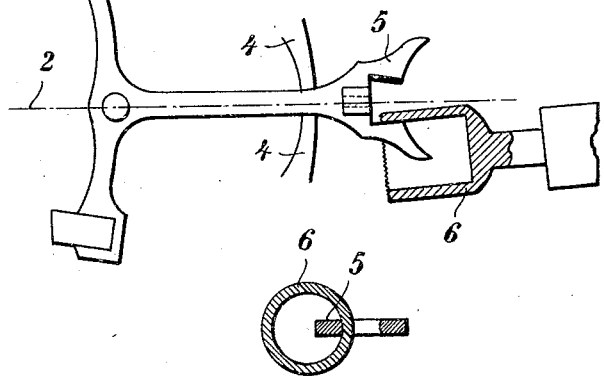
*Fig.3.*
R. Schwaar
   INVENTOR
By Maes Olein
       Attys.

Patented Nov. 17, 1931

1,831,973

UNITED STATES PATENT OFFICE

RENÉ SCHWAAR, OF BIENNE, SWITZERLAND

METHOD AND DEVICE FOR FINISHING THE INNER EDGES OF THE NOTCHES OF PALLETS OF WATCH MOVEMENTS

Application filed April 28, 1930, Serial No. 448,084, and in Switzerland May 4, 1929.

The present invention relates to a method and a device for finishing the inner edges of the notch of the pallet of watch movements and consists in means for introducing a cup-shaped cutter, that is a hollow cylindrical cutter, from the outside along the converging side edges of said notch so as to cut edges having a convex cross section and running in a truly convergent direction with regard to the symmetrical axis of the pallet.

The accompanying drawings represent a working example of the invention in

Fig. 1 by a plan of the general arrangement in

Fig. 2 by a longitudinal section through the tool and in

Fig. 3 by a cross section through the tool and the edges of the pallet's fork.

The axis 1 of the tool-holder or of the spindle of the tool for finishing the side edges of the notch in the pallet is arranged horizontally and in line with the symmetrical axis 2 of the pallet 5 held fast on a rest 3 by means of the jaws 4. The tool, a cup-shaped cutter 6, representing a hollow cylinder cut-off perpendicularly to its axis and provided with a toothed edge, is held at the end of spindle 9 slidably arranged in bearings 7 and 8 and is carrying a sheave 10 the free end of the spindle being shaped like a handle 12 having two check faces 11. A pressure spring 13 maintains the tool-holder in a retreated position from the rest 3. In this position the sheave rests against the bearing 8. According to the two inclined side edges of the notch the spindle 9 must assume two working positions on both sides of the symmetrical axis of the pallet in such a way that by pushing the handle 12 forward the edge of the cutter will move in a divergent direction from the symmetrical axis of the fork. To this end the base plate 14 of this tool-holder is disposed on the bed plate 15 and pivotally about the vertical axis of the bearing 7 next to the pallet. The swinging movements of the base plate 14 is limited by the adjustable stop screws 17 held on standards 16 and cooperating with the check faces 11 of the handle 12. The extreme working positions of the tool holder are determined respecting the inclination of the side edges of the notch by the position of the stop screws 17 and respecting the depth of introduction of the cutter into the notch by the free space left between the hub of the sheave 10 and the bearing 7.

The device for clamping the pallet, that is the jaws 4 are managed so that one jaw is kept stationary while the other is moved in order to bring each pallet to be worked into the same true working position.

What I claim as new is:

1. Method for finishing the inner edges of the notch of the pallet of watch-movements and consisting in positioning the spindle of a tool holder provided with a cup-shaped cutter having a toothed edge into two extreme predetermined diverging directions from the symmetrical axis of the pallet and in advancing the cutter so as to execute side edges having the true inclination and a convex cross section.

2. Device for finishing the inner edges of the notch of the pallet of watch movements, said device comprising a rest plate provided with means for holding the pallet with its forked portion extended over the edge of the plate, a bed plate supporting said rest plate, a horizontal spindle of a tool holder carrying a cup shaped cutter provided with a toothed edge and held slidably in an axial direction, a base plate carrying said spindle and held pivotally in a horizontal sense on said bed plate, means for checking the side throw of the bed plate in two predetermined extreme side positions, a spring put on said spindle to keep the same withdrawn from the working position and a handle formed on said spindle as means for advancing the cutter in the two extreme side positions.

In testimony whereof I affix my signature.

RENÉ SCHWAAR.